United States Patent
Röjemo

(10) Patent No.: US 6,625,672 B1
(45) Date of Patent: Sep. 23, 2003

(54) DIVIDED BUFFER

(75) Inventor: Niklas Röjemo, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/547,386

(22) Filed: Apr. 11, 2000

(30) Foreign Application Priority Data

Apr. 12, 1999 (SE) ................................................ 9901290

(51) Int. Cl.[7] ........................ G06F 13/20; G06F 13/28
(52) U.S. Cl. ........................ 710/52; 710/56; 711/154; 711/163; 712/35; 365/189.05
(58) Field of Search ..................... 710/52, 56; 711/154, 711/165; 712/35; 365/189.05

(56) References Cited

U.S. PATENT DOCUMENTS

| | | | | |
|---|---|---|---|---|
| 5,233,603 A | * | 8/1993 | Takeuchi et al. | ............. 370/412 |
| 5,490,113 A | * | 2/1996 | Tatosian et al. | ........ 365/189.05 |
| 5,809,557 A |   | 9/1998 | Shemla et al. | ............... 711/173 |
| 5,852,826 A | * | 12/1998 | Graunke et al. | ................ 707/7 |
| 6,256,218 B1 | * | 7/2001 | Moon | ..................... 365/230.03 |
| 6,290,406 B1 | * | 9/2001 | Gauthier et al. | .............. 400/61 |
| 6,362,649 B1 | * | 3/2002 | McGowan | .................... 326/39 |

FOREIGN PATENT DOCUMENTS

| | | |
|---|---|---|
| EP | 0 886454 | 12/1998 |
| JP | 3-212776 | 9/1991 |

OTHER PUBLICATIONS

Pihlgren, O.; International–Type Search Report; Search Request No. SE99/00544; Jan. 25, 2000, pp. 1–4.

* cited by examiner

*Primary Examiner*—Rehana Perveen
(74) *Attorney, Agent, or Firm*—Jenkens & Gilchrist, P.C.

(57) ABSTRACT

The present invention relates to a buffer device of the first-in-first-out type. The buffer device comprises a data inlet, a data outlet and a storage buffer. The buffer device also comprises an integrated circuit, which comprises an input buffer and an output buffer. An arrangement in the buffer device is used to combine the data inlet with the data out via either one of the buffers on the integrated circuit or via at least two of the buffers connected in series.

9 Claims, 4 Drawing Sheets

DIVIDED BUFFER

BACKGROUND OF THE INVENTION

1. Technical Field of the Invention

The present invention relates to a device and a method for transporting data through a buffer of the first-in-first-out type.

2. Description of Related Art

Data processing often takes place in integrated circuits. When a stream of data arrives to a data processing unit in a circuit, it is important that each individual data element is treated in a predetermined order and that time can elapse between each process. When a data element arrives, the processing of the element should be independent of when the next element arrives. A buffer may be used for buffering the data elements, and often a buffer of the first-in-first-out type, a so-called FIFO-register, is used. The first element to be written to a FIFO-register is also the first element to be read. Often writing and reading take place at a high rate and FIFO-registers that are used must meet the requirements of rate. It is important that the writing of an element to the FIFO-register, the transport of the element from the inlet to the outlet as well as reading from the FIFO-register are fast. To meet the requirement of rapidity when a buffer is used in an integrated circuit, the buffer is made a part of the integrated circuit. When the buffer constitutes a part of the integrated circuit, writing and reading can be fast. On the other hand, a problem arises in that some silicon surface must be sacrificed on the integrated circuit to give room for the buffer. The problem becomes especially noticeable in the case of the buffer having to be able to store many data elements. In the Japanese Patent Application JP 3212776 the buffer is divided into two parts. The first buffer part is a part of the integrated circuit, and is accordingly present on the same silicon, while the second buffer part is separated from the integrated circuit. The two buffer parts are connected so that data is first written to the second buffer part and is thereafter transported to and read from the first part. The requirement of buffer size is met by the second buffer part, which is not a part of the integrated circuit and accordingly does not take any silicon space. Since the first part is built on the same circuit as the data processing part, data can be accessed from this buffered part without delay. The problem remaining is writing to and reading from the second buffer part, which again is separated from the integrated circuit. Since the second buffer part is separated from the unit from which data is coming in as well as the unit to which data is sent, a delay arises in comparison with the case of these units being present on the same circuit as the buffer. The requirement of rapidity is especially important when the buffer contains only a few elements.

BRIEF DESCRIPTION OF THE INVENTION

The present invention tackles the problem of creating sufficient storage capacity in a buffer of the FIFO type, which is used in an integrated circuit, without taking up unnecessary circuit space and without waiving the requirement of rapidity.

This problem is solved according to the invention by dividing the buffer device into three buffer parts:

An input buffer which is a part of the integrated circuit.
An output buffer which is a part of the integrated circuit.
A storage buffer which is separated from the integrated circuit.

The object of the invention is to create a flexible buffer device which, depending on the data traffic level in the buffer, can be adapted so that requirements of rapidity as well as storage space are met.

In further detail, the buffer device according to the invention comprises a data inlet and a data outlet and also an arrangement for combining the inlet with the outlet via either one of the buffer parts or via a plurality of the buffer parts connected in series. The different FIFO constellations are used at different operating conditions.

The choice of operating condition depends on the number of elements present in the buffer device at the moment and also to which buffer parts these are distributed. The data inlet is combined with the data outlet via different buffer parts by means of a method according to the invention which comprises the following steps:

combining the data inlet with the data outlet via one of the buffers on the integrated circuit;

combining the data inlet with the data outlet via at least two of the buffers, connected in series.

An advantage of the invention is that a large number of data elements can be engaged by the buffer without circuit space for more than a few elements being used on the integrated circuit.

Another advantage of the invention is that writing and reading to/from the buffer can take place at a high rate.

A further advantage is that the time for transporting data can be minimized since access of the separated storage may take place by bursts, or as an alternative, by the width of the bus to the external storage being made large.

Yet another advantage is that a plurality of buffer devices in an effective way can share the same external storage space.

Yet a further advantage of the invention is that conflict situations when reading and writing data can be minimized.

The invention will now be described closer with the aid of preferred embodiments and with reference to attached drawings.

DETAILED DESCRIPTION OF THE PREFERRED EMBODIMENTS

Figure 1:
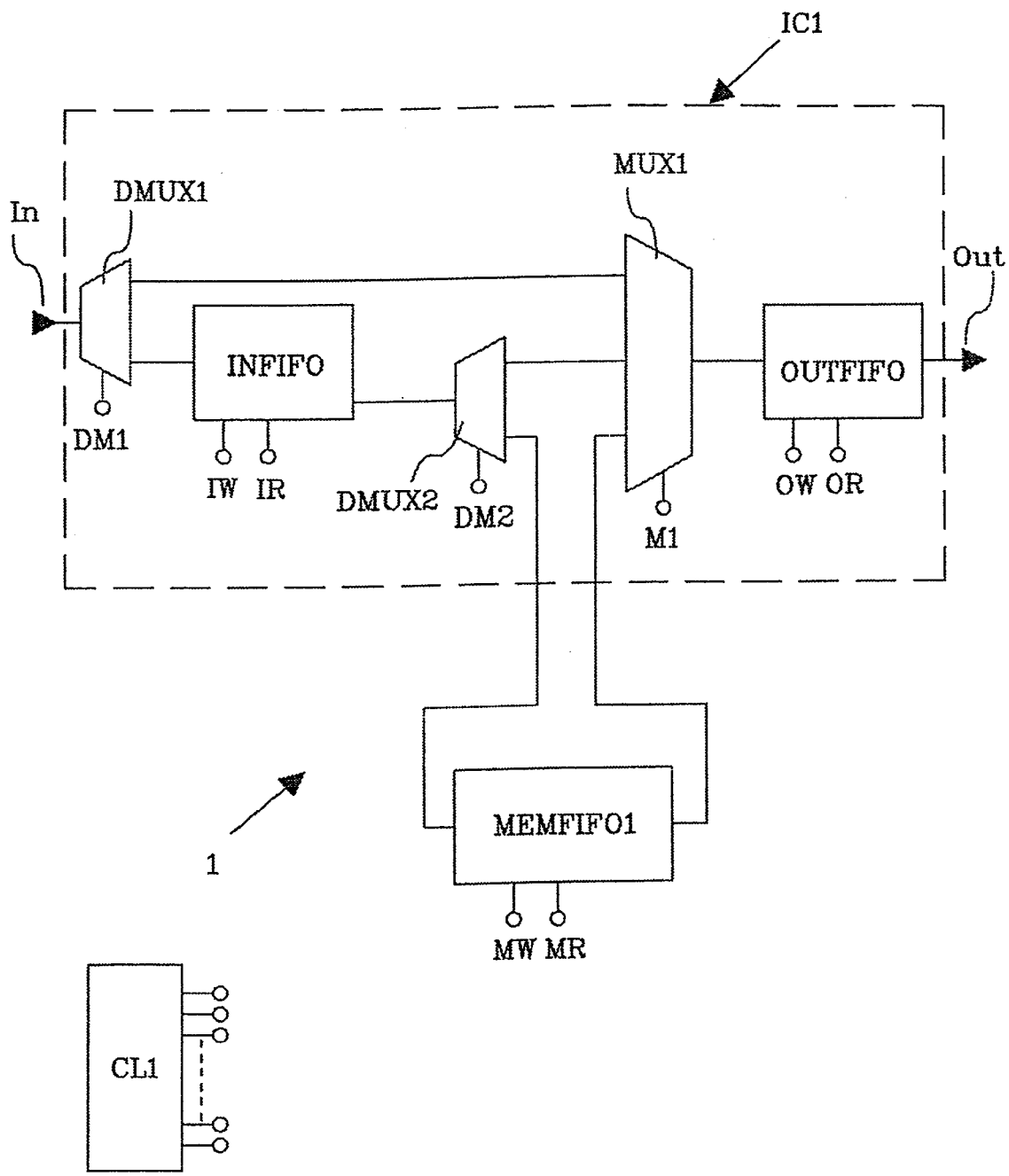
FIG. 1 shows a block diagram of a buffer device according to the invention.

FIG. 1 shows a buffer device 1 according to the invention. The buffer device is of the FIFO type, i.e. the data element which is first written to the buffer device is also the element which is first read from the buffer device. The buffer device comprises a data inlet In to which data elements can be written. The buffer device also comprises a data outlet Out from which data can be read after having passed through the buffer. Additionally, the buffer device comprises an integrated circuit part IC1, which comprises an output buffer OUTFIFO, which according to the embodiment example can engage eight data elements and also an input buffer INFIFO, which also can engage eight data elements. The output buffer as well as the input buffer are of the FIFO type and constitute a part of the integrated circuit, i.e. they are a part of the silicon which the integrated circuit is built from. The data element can be written to or read from the output buffer OUTFIFO as well as the input buffer INFIFO. Writing from the integrated circuit to one of the buffers INFIFO, OUTFIFO can take place without delay since the buffer is a part of the integrated circuit. In the same way, reading to the integrated circuit from the buffers is done without delay. Writing to the output buffer takes place by the writing inlet OW being activated. Reading from the buffer takes place in the same way by activating the reading inlet OR of the output buffer. Apart from the two buffers on the integrated circuit IC1, the buffer device 1 comprises an additional buffer, a so-called storage buffer MEMFIFO1. The storage buffer, which is a storage unit separated from the integrated circuit, comprises according to the embodiment example a storage capacity of 1024 data elements. Writing and reading to/from the storage buffer is done with the aid of the buffer's writing inlet MW and reading inlet MR, respectively. Writing to and reading from the different buffers OUTFIFO, INFIFO and MEMFIFO1 are handled by a check logic CL1. The check logic CL1 also keeps count of the number of data elements present in the different buffers INFIFO, OUTFIFO and MEMFIFO1. A buffer according to the embodiment example comprises four address registers, viz. a starting address register, a stopping address register, a writing address register and also a reading address register. The starting- and stopping address registers keep in order where in the storage the buffer starts and ends. In the starting condition, the writing address register and the reading address register are set equal to the starting address register. Each writing counts up the writing address register and each reading counts up the reading address register. When the value in the writing address register becomes the same as the value in the stopping address register, the value in the starting address register is written in the writing address register, i.e. the writing takes place from the beginning again. The corresponding thing happens when the reading address register reaches the stopping address. There is also a counter which counts up for writings and down for readings. If this is zero, nothing can be read from the buffer (it is empty) and if the counter is equal to the stopping register minus the starting register, it is not possible to write to the buffer (it is full). The buffer device 1 comprises an arrangement which consists of different types of multiplex units. With the aid of the multiplex units the buffers INFIFO, OUTFIFO and MEMFIFO1 can be connected in different ways in relation to each other, so that data elements can pass through different FIFO constellations, depending upon different operating situations. These constellations will be explained closer with reference to FIG. 2. The data inlet In is connected to a first demultiplex unit DMUX1, comprising two outlets. One of the outlets is connected to the inlet on the input buffer INFIFO. The other outlet is connected to one of three inlets on a multiplex unit MUX1. A second demultiplex unit DMUX2 also comprises an inlet and two outlets. The inlet is connected to the outlet of the input buffer INFIFO. One of the two outlets is connected to one of the inlets on the multiplex unit MUX1, and the other of the two outlets is connected to the inlet of the storage buffer MEMFIFO1. The outlet of the storage buffer is connected to the remaining one of the three inlets on the multiplex unit MUX1. The outlet of the multiplex unit is connected to the inlet of the output buffer OUTFIFO. Which one of the outlets that the inlet on a demultiplex unit DMUX1 or DMUX2 is to be combined with is decided by the address that is provided to the respective address inlet DM1 or DM2 of the multiplex unit. In the same way, the address of an address inlet M1 decides which one of the inlets of the multiplex unit MUX1 is to be combined with the outlet. The address inlets of the respective multiplex units DMUX1, DMUX2 and MUX1 are connected to the check logic CL1. Thereby the check logic can regulate to which one of the outlets in the demultiplex units DMUX1 and DMUX2 incoming data is to be directed, and from which inlet that outgoing data is to come in the multiplex unit MUX1.

Figure 2A:
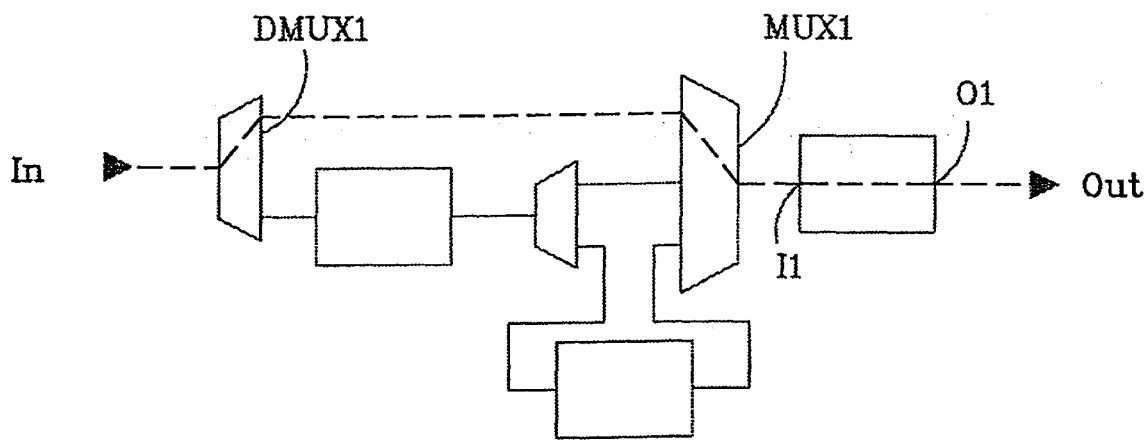
FIGS. 2a–c shows by block diagrams three different operating conditions for the buffer device according to the invention.
Figure 2B:
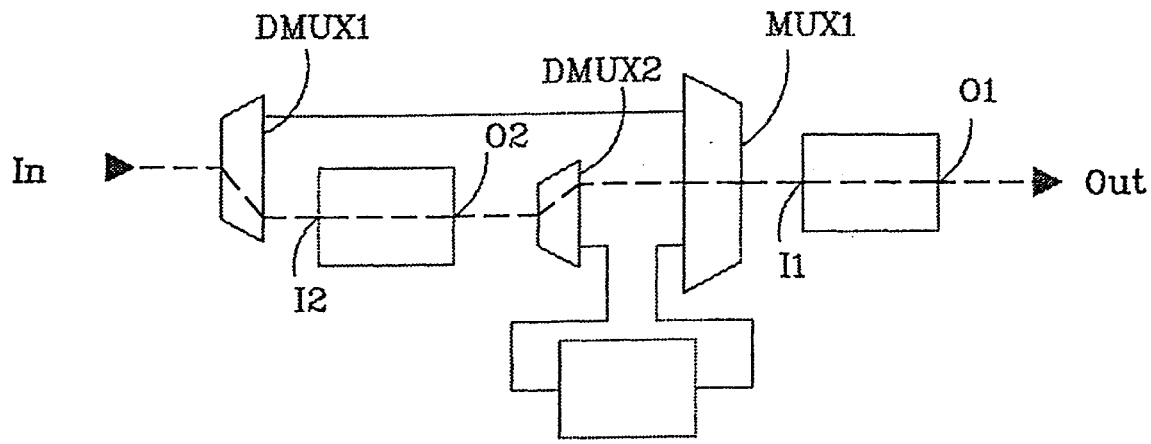
Figure 2C:
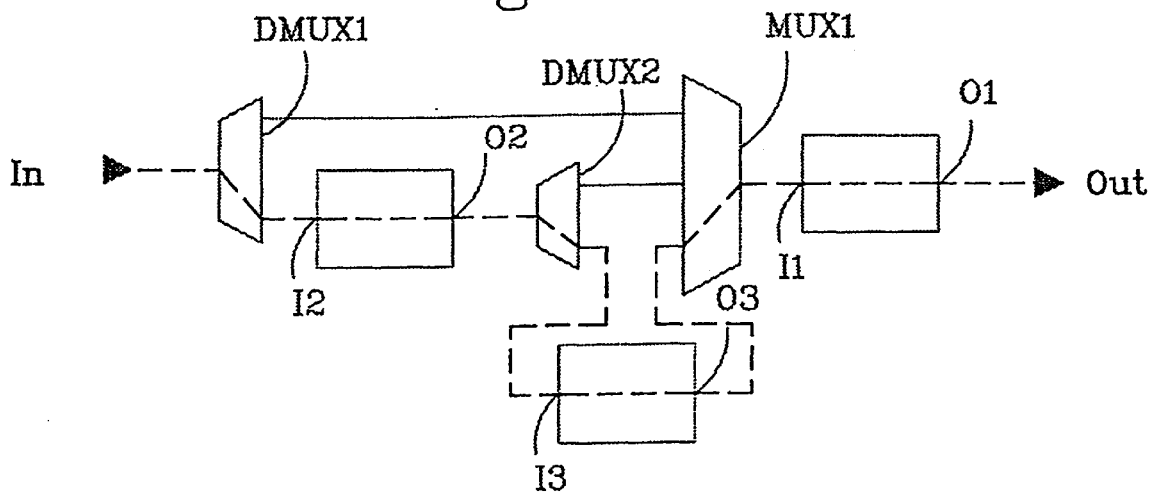

FIGS. 2a–c shows the buffer device in FIG. 1 when this, with the aid of the multiplex units, has assumed different operating conditions. In FIG. 2a, a first operating condition is shown. The check logic has in FIG. 2a influenced the first demultiplex unit DMUX1 so that the data inlet In via the demultiplex unit has been combined with an inlet of the multiplex unit MUX1. The check logic has also influenced the multiplex unit MUX1 so that the inlet is connected to the inlet I1 of the output buffer. The outlet O1 of the output buffer is connected to the data outlet Out. In this first operating condition, the data inlet In is accordingly connected to the data outlet Out via the output buffer OUTFIFO.

In FIG. 2b, a second operating condition is shown. The check logic CL1 has here influenced the first demultiplex unit DMUX1 so that the data inlet In is connected to the inlet I2 of the input buffer INFIFO. The outlet O2 of the input buffer is connected to the inlet of the second demultiplex unit DMUX2. The second demultiplex unit DMUX2 has been influenced by the check logic CL1 so that a connection has been established between the inlet of the second demultiplex unit and one of the inlets of the multiplex unit MUX1. The check logic has also influenced the multiplex unit MUX1 so that this inlet is connected to the inlet I1 of the output buffer OUTFIFO. Accordingly, in this second operating condition, the data inlet In is connected to the data outlet Out via the input buffer INFIFO and via the output buffer OUTFIFO.

In FIG. 2c, a third operating condition is shown. The check logic CL1 has here influenced the first demultiplex unit DMUX1 so that the data inlet In is connected to the inlet I2 of the input buffer INFIFO. The outlet O2 of the input buffer is connected to the inlet of the second demultiplex unit DMUX2. The second demultiplex unit has been influenced by the check logic so that a connection has been established between the inlet of the demultiplex unit and the inlet of the storage buffer MEMFIFO1. The outlet of the storage buffer is connected to one of the inlets of the multiplex unit MUX1 and the multiplex unit has been influenced by the check logic CL1 so that this inlet is connected to the inlet I1 of the output buffer OUTFIFO. In this third operating condition, the data inlet In is connected to the data outlet Out via the input buffer INFIFO, the storage buffer MEMFIFO1 and the output buffer OUTFIFO.

The first operating condition, where the data inlet In is connected to the data outlet Out via the output buffer OUTFIFO, is used when the buffer device is empty or contains only a few data elements. A data element on the data inlet In is transported to the inlet In of the output buffer. A negative pulse edge on the writing inlet OW from the check logic writes the data element in the output buffer OUTFIFO and puts the element last in a queue. A negative pulse edge on the reading inlet OR reads whenever desired the next data element in turn, i.e. which is first in the queue in the output buffer. Since the buffer device in this operating condition is built up by only one buffer part, which is a part of the integrated circuit IC, the transport between the data inlet In and the data outlet Out can be rapid. The first operating condition can be utilized as long as the output buffer is not full, i.e. contains less than eight elements according to the embodiment example.

In the second operating condition, the data inlet In is connected to the data outlet Out via the input buffer INFIFO and the output buffer OUTFIFO. A data element at the data inlet In is transported to the input buffer where the element is written in the input buffer and is placed last in the queue. If the output buffer OUTFIFO is not full, i.e. contains less than eight data elements, the first element in the queue is read from the input buffer INFIFO, and the element is transported to the output buffer OUTFIFO. Thereafter, writing is done to the output buffer OUTFIFO, where the element is now placed last in the queue in the output buffer. The buffer device is in this operating condition built up by two buffer parts, which both belong to the integrated circuit IC. Therefore, the transport between the data inlet In and the data outlet Out takes place without delay. Satisfactory rapidity is still obtained for the element transactions through the buffer device. Additionally, in comparison with the first operating condition, the device now has room for further elements.

In the third operating condition, the data inlet In is connected with the data outlet Out via the input buffer INFIFO, the storage buffer MEMFIFO1 and the output buffer OUTFIFO. A data element at the data inlet In is transported to the input buffer INFIFO. If the input buffer now contains four data elements, a change to the third operating condition takes place. The four data elements in the input buffer INFIFO are sent to the storage buffer MEMFIFO1 in the form of a burst, i.e. all four elements are written sequentially in a storage area in the storage buffer MEMFIFO1. A sequential writing of all four data elements means that all four elements are written in succession after each other, which makes it possible to effectively utilize the storage with burst access modes. Bursts also group readings and writings so that there are less changes between them, something which makes the utilization of the storage in pipeline more effective. The writing is done without interruption, i.e. without interruption due to reading from the buffer. The four data elements are put last in the queue in the storage buffer MEMFIFO. If the output buffer OUTFIFO has room for four or more data elements, reading in burst form takes place of the four data elements that are first in the queue in the storage buffer. Despite storage capacity now also being utilized outside of the integrated circuit, satisfactory rapidity is obtained with the aid of simultaneous transport of a plurality of elements in the form of a burst.

Figure 3:
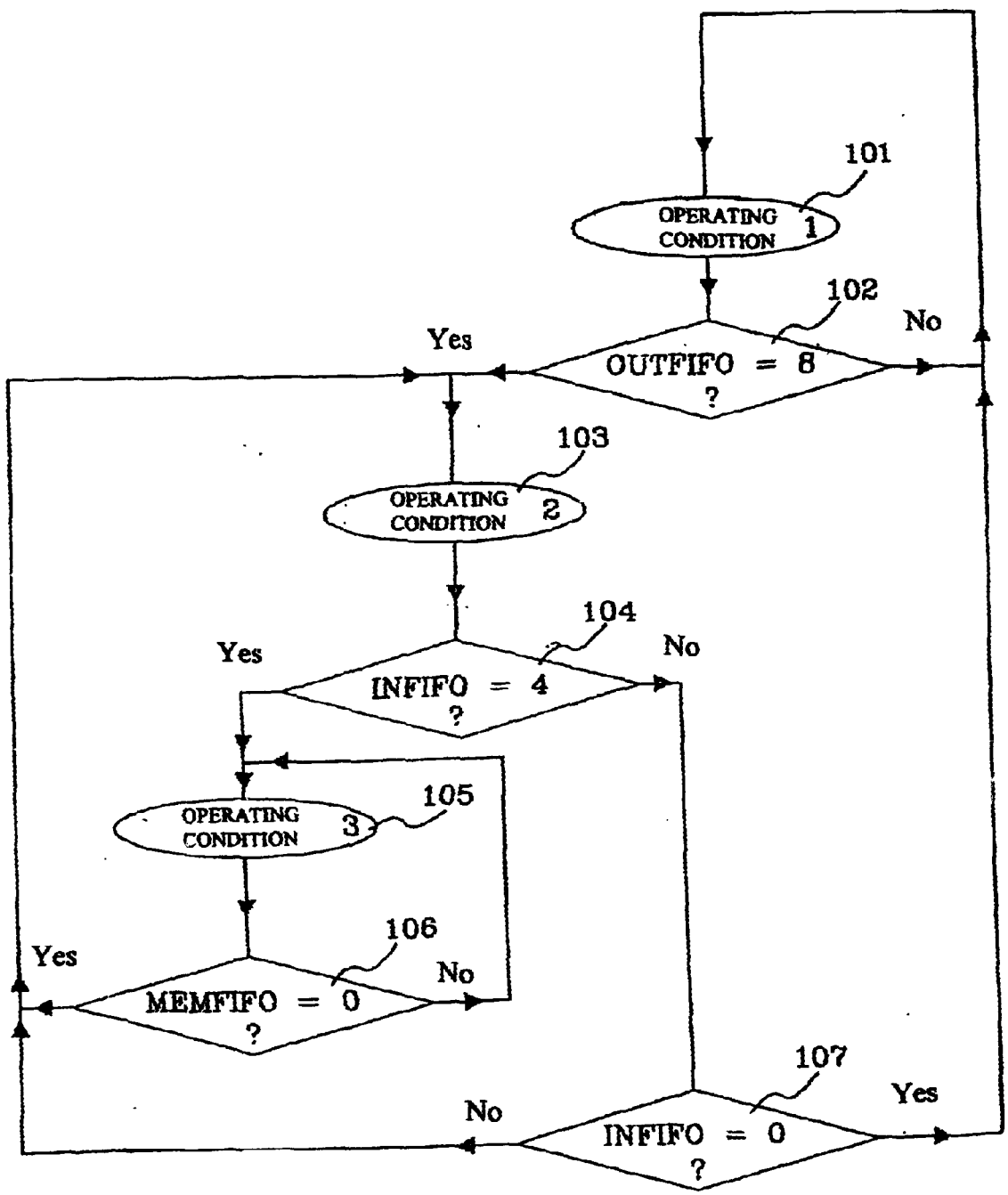
FIG. 3 shows through a flow diagram a method according to the invention to shift between the different operating conditions of the buffer device.

In FIG. 3, a method according to the invention is shown. The figure shows, with different blocks, the three different operating conditions and when changing between these takes place. The direction from one block to the next one is in the figure indicated with arrows. The transfer from one block symbolizing an operating condition to the next block that symbolizes an operating condition, is initiated either by a data element being written to the buffer device or a data element being read from the buffer device. For example, if one is in the third operating condition, in FIG. 3 shown with a block 105, changing takes place to the next block 106, and thereafter further to the next operating condition, either when a data element has been written to the buffer device or when a data element has been read from the buffer device. The first operating condition is in the figure shown with a block 101. The first operating condition means that the data inlet In is connected with the data outlet Out via the output buffer OUTFIFO. In the embodiment example it is assumed that the output buffer comprises seven elements while the input buffer INFIFO as well as the storage buffer MEMFIFO1 comprise zero elements. At writing or reading of an element, transfer takes place in the figure to block 102. In the block 102 it is checked if the output buffer now after writing or reading comprises eight elements. If the check results in the reply "No", transfer takes place back to the block 101 and the buffer device remains in the first operating condition. If instead the check results in the reply "Yes", which as we know is the case according to the embodiment example after a writing, i.e. if the output buffer after writing contains eight elements, transfer in the figure takes place to a block 103 and a change to the second operating condition takes place. In the second operating condition, the data inlet In is connected to the data outlet Out via the input buffer INFIFO and the output buffer OUTFIFO. According to the embodiment example, the output buffer now, after the transaction, comprises eight elements while the input buffer and the storage buffer do not comprise any elements. The next element transaction, which is a reading from the buffer device, results in the output buffer now comprising seven elements. The first thing that takes place after the transaction is a transfer in the figure to a block 104, where it is checked if the input buffer comprises four elements. Since this is not the case, a transfer takes place in the figure to a block 107. In block 107 it is checked if the input buffer comprises zero elements. Since the input buffer according to the embodiment example comprises zero elements, a transfer takes place in the figure to block 101, and the buffer device is once against set to the first opera-ting condition. Now, assume instead that the buffer device is in operating condition 2 and that the output buffer OUTFIFO comprises eight elements, the input buffer INFIFO comprises 1–3 elements. If the next element transaction is a reading, the device will remain in operating condition 2. The read element is the one that was first in the output buffer, and the first element in the input buffer is moved to the last position in the output buffer, i.e. after the reading there is 8 elements in the output buffer and 0–2 elements in the input buffer. If an element is written to the device when the output buffer has eight elements and the input buffer has less than three elements, this results in that the new element is put last in the input buffer, and the device remains in the operating condition 2. If an element is written to the device when the output buffer has eight elements and the input buffer has three elements, a transfer takes place in the figure to the block 104, and since the input buffer now comprises four elements, a transfer takes place to a block 105, i.e. the device is set to the third operating condition. In the third operating condition, the data inlet In is connected to the data outlet Out via the input buffer INFIFO, the storage buffer MEMFIFO1 and the output buffer OUTFIFO. The four first elements in the queue in the input buffer INFIFO is transferred in a burst to the storage buffer MEMFIFO1 which now accordingly comprises four elements. If the next transaction is a writing to the buffer device, a writing takes place in the input buffer INFIFO. In the figure, a transfer takes place to block 106 but since the storage buffer is not empty, the device remains in the third operating condition. After three additional writings to the buffer device, the first four elements in the queue in the input buffer INFIFO are transferred in a burst to the storage buffer MEMFIFO1. Accordingly, the storage MEMFOFO1 now comprises eight elements, the input buffer INFIFO comprises zero elements and the output buffer OUTFIFO still comprises four elements. In the figure, a transfer takes place from block 105 to block 106. In block 106 it is checked if the storage buffer comprises zero elements. Since the answer to the question is "No", a transfer takes in the figure back to block 105, and the device remains in the third operating condition. If there are four or more free spaces in the output buffer OUTFIFO when the buffer device is in the third operating condition, data elements are read from the storage buffer MEMFIFO1 and are written to the output buffer OUTFIFO. The transfer of the data elements from the storage buffer to the output buffer takes place in the form of a burst. Four elements are transferred in the burst according to the embodiment example.

Figure 4:
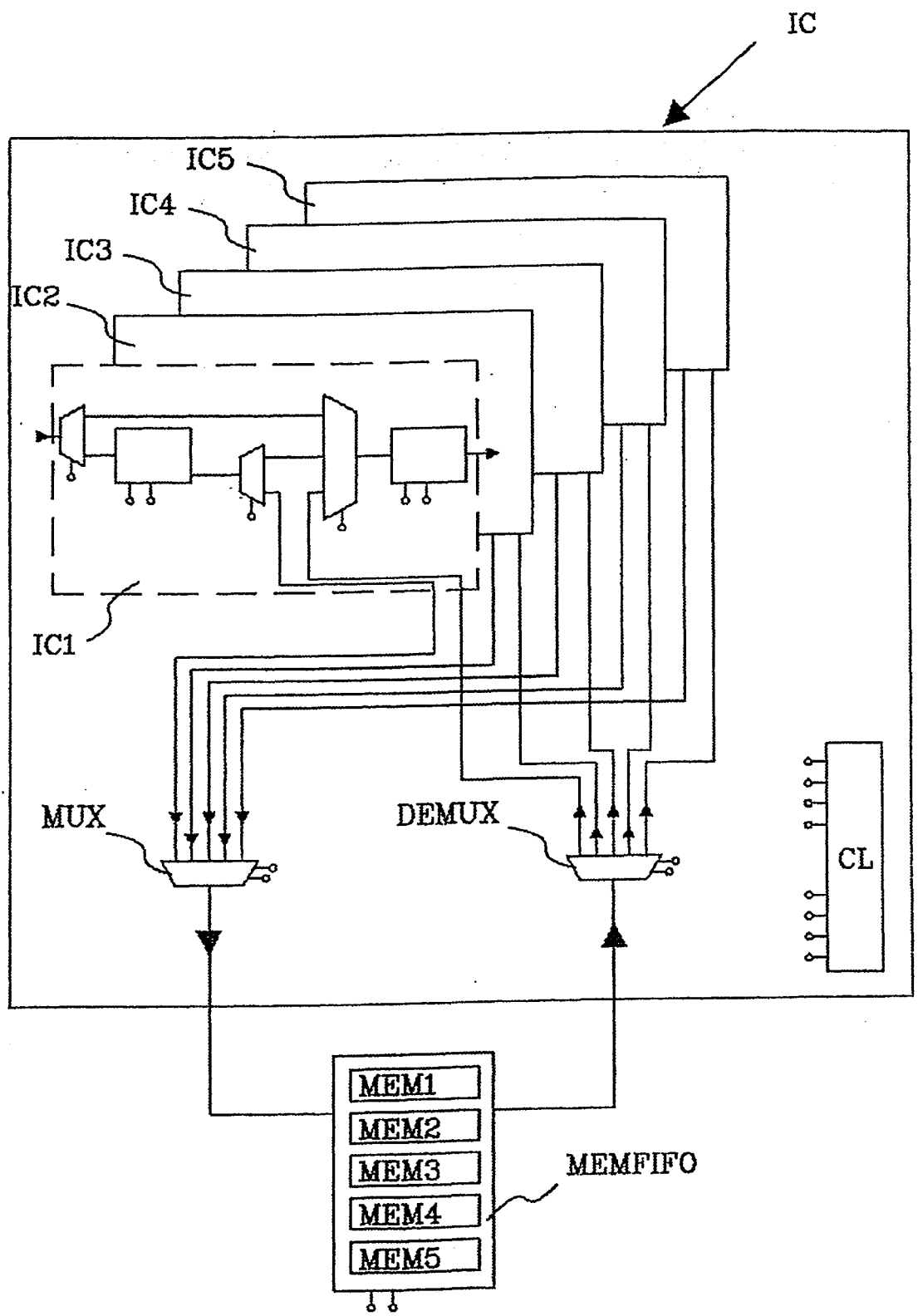
FIG. 4 shows a block diagram of a system of buffer devices according to the invention.

In FIG. 4, a buffer system according to the invention is shown in a second embodiment example. In the figure, the same integrated circuit part IC1 is shown, as has been shown earlier in FIG. 1. The parts that are included in the integrated circuit IC1 have not been indicated with reference designations in FIG. 4. Therefore the reference designations are only found in FIG. 1, and the different parts have in FIG. 4 been indicated only with the symbols for the respective parts. The integrated circuit part IC1, the so-called first circuit part, comprises the data inlet In, the data outlet Out, the output buffer OUTFIFO, the input buffer INFIFO and also a multiplex unit MUX1 and two demultiplex units DMUX1, DMUX2. The first circuit part IC1 constitutes a part of a larger integrated circuit IC. The larger integrated circuit IC comprises according to the embodiment example four additional circuit parts. The four circuit parts are denominated a second circuit part IC2, a third circuit part IC3, a fourth circuit part IC4, and a fifth circuit part IC5. Accordingly, the five circuit parts are on the same integrated circuit IC, i.e. on the same silicon surface. The five circuit parts are according to the embodiment example identical but only the first circuit part is shown in detail in FIG. 4, while the other parts are only shown symbolically. The second demultiplex unit DMUX2 was in the first embodiment example connected to an inlet on the storage buffer MEMFIFO1. In this second embodiment example, the five circuit parts IC1, IC2, IC3, IC4, and IC5 share the same storage buffer MEMFIFO. The second multiplex unit DMUX2 on the first circuit part IC1 is in the second embodiment example connected to a first inlet of a multiplex unit MUX on the integrated circuit IC. The outlet of the multiplex unit MUX is connected to an inlet on the storage buffer MEMFIFO. The outlet on the storage buffer MEMFIFO is connected to an inlet on the demultiplex unit DMUX. A first outlet from the demultiplex unit DMUX is connected to one of the inlets on the multiplex unit MUX1 on the first circuit part IC1. A second inlet on the multiplex unit MUX is connected to a second multiplex unit on the second circuit part IC2. In FIG. 4, the second multiplex unit on the second circuit part IC2 is not shown. Only a connection from the second circuit part to the multiplex unit MUX is shown. The remaining circuit parts IC3, IC4 and IC5 are also connected to the multiplex unit MUX in the same way, but only the connection itself is shown in FIG. 4. A second outlet on the demultiplex unit DMUX is connected to a multiplex unit on the second circuit part IC2. The remaining outlets on the demultiplex unit DMUX is in the same way connected to the other circuit parts IC3, IC4 and IC5 on the integrated circuit IC. The storage buffer is divided into the same number of parts MEM1, MEM2, MEM3, MEM4 and MEM5 as there are circuit parts IC1, IC2, IC3, IC4 and IC5 on the integrated circuit IC, and each circuit part utilizes its part of the storage buffer MEMFIFO. A buffer device is composed of a circuit part IC1 together with the associated storage buffer part MEM1. Also in FIG. 4, a check logic CL is shown which has mainly the same features and function as the check logic CL1, which has been described earlier in the first embodiment example. The check logic CL handles writing of a data element to a buffer device, transfer of the data element through the buffer device, and also reading of the data element from the buffer device. The difference from the first embodiment example is that in this second embodiment example, the check logic CL handles all buffer devices, i.e. according to the embodiment example all five buffer devices IC1+MEM1, IC2+MEM2, IC3+MEM3, IC4+MEM4 and IC5+MEM5 are handled. Some of the connection points between the check logic CL1 and the parts that are checked by the check logic have in FIG. 4 been indicated with contact symbols.

According to the embodiment example, writing to as well as reading from one of the five buffer devices is independent of the remaining four buffer devices. Writing to a buffer device takes place sporadically as data is coming in, and without influence from the other buffers in the buffer system. The same is true for reading from the buffer devices. As has already been described, a buffer device changes from a second operating condition to a third operating condition when the amount of data elements in the input buffer has exceeded a predetermined value. When changing to the third operating condition according to the first embodiment example, the storage buffer MEMFIFO1 was connected between the input buffer INFIFO and the output buffer OUTFIFO. In this embodiment example, the check logic connects only the part of the storage buffer MEMFIFO which belongs to the circuit part. The connection takes place via the multiplex unit MUX and the demultiplex unit DMUX. Connec-tion of the first circuit part IC1 to the first part MEM1 in the storage buffer MEMFIFO is done when changing to the third operating condition, i.e. when the input buffer after reading contains four elements. Transport between the input buffer INFIFO and the storage buffer MEMFIFO is done in burst form. When the transport is completed, the multiplex unit MUX remains in its condition until another data element is to be written to another input buffer in another of the buffer devices, which input buffer already comprises a predetermined number of data elements. The same procedure takes place when reading from the storage buffer MEMFIFO via the demultiplex unit DMUX to one of the circuit parts. Thus the transport of data elements between a part MEM1 of the storage buffer and a circuit part IC1 takes place in burst form. Since four data elements are sequentially transported from the input buffer to the storage buffer and from the storage buffer to the output buffer, the storage space in the buffer can rapidly be made available, compared to the case of only one element being transported at a time. This means that the risk of conflict situations at writing and reading of data elements to/from the storage buffer is minimized. The risk of conflict situations can also be minimized by increasing the size of the input buffer and/or the output buffer.

The invention is not limited to the embodiments described above. For example, the size of the different buffers can vary. Also the size of the input buffer and the output buffer does not need to be the same. The different number of elements that are to be in the different buffer parts for changing to take place from one operating condition to another may also vary. For example, an output buffer does not need to be full for a change to take place to the next operating condition. The implementation of a buffer does not need to be built up in detail as has been described earlier, rather what is significant is that the input buffer and the output buffer are on the circuit and are fast, while the storage buffer is external and has a large storing capacity. Writing to a storage buffer can take place without this being done in burst form as was the case in both embodiment examples. Another possibility is that writing to the storage buffer takes place in burst form, while only separate elements are read from the storage buffer in each reading cycle, or vice versa. The amount of elements that are transported in a burst can vary and the amount of elements that are written to the storage buffer in a burst can be different from the amount of elements that are read from the storage buffer in another burst. Also, it is conceivable that the storage buffer shown in the second embodiment example at the same time can be used by different buffer devices as well as other units in the system.

Accordingly, the invention is not limited to the embodiments described above and shown on the drawings but can be modified within the scope of the enclosed claims.

What is claimed is:

1. A buffer device of the first-in-first-out type having a data inlet, a data outlet and a storage buffer, comprising: an integrated circuit part comprising an input buffer and an output buffer and an arrangement including a multiplexer and at least one demultiplexer to combine the data inlet with the data outlet via at least one of the input or output buffers on the integrated circuit or a plurality of buffers connected in series.

2. The buffer device according to claim 1, wherein the output buffer comprises an outlet connected to the data outlet, said arrangement capable of setting the device to one of the following operating conditions:
   a first condition, wherein the data inlet is connected to an inlet of the output buffer;
   a second condition, wherein the data inlet is connected to an inlet of the input buffer and where an outlet of the input buffer is connected to the inlet of the output buffer, and;
   a third condition, wherein the data inlet is connected to the inlet of the input buffer, the outlet of the input buffer is connected to an inlet of the storage buffer, and an outlet of the storage buffer is connected to the inlet of the output buffer.

3. The buffer device according to claim 1, further comprising means for, in the form of a burst, transporting a plurality of data elements from the input buffer to the storage buffer.

4. The buffer device according to claim 1, further comprising means for, in the form of a burst, transporting a plurality of data elements from the storage buffer to the output buffer.

5. A method for conducting data elements through a buffer device of the first-in-first-out type, between a data inlet and a data outlet, said buffer device comprising a storage buffer and an integrated circuit part which comprises an input buffer and an output buffer, said method comprising the following steps:
   combining the data inlet with the data outlet via one of the buffers on the integrated circuit;
   combining the data inlet with the data outlet via at least two of the buffers connected in series;
   influencing the device to make it change to a second operating condition if the device is in a first operating condition and if the number of elements in the output buffer exceeds a predetermined number;
   influencing the device to make it change to a third operating condition if the device is in the second operating condition and if the number of elements in the input buffer exceeds a predetermined number;
   influencing the device to make it change to the second operating condition if the device is in the third operating condition and if the number of elements in the storage buffer is less than a predetermined number; and
   influencing the device to make it change to the first operating condition if the device is in the second operating condition and if the number of elements in the input buffer is less than a predetermined number.

6. The method according to claim 5, further comprising the step of transporting, in the form of a burst, a plurality of data elements from the input buffer to the storage buffer.

7. The method according to claim 5, further comprising the step of transporting, in the form of a burst, a plurality of data elements from the storage buffer to the output buffer.

8. A buffer system comprising at least two buffer devices, wherein different external storage buffers in each of said at least two buffer devices are included in a same storage buffer unit, such that said system distributes writing permission and reading permission to each of said at least two buffer devices to and from the storage buffer unit, and means for, in the form of a burst, transporting a plurality of data elements from an input buffer in at least one of said at least two buffer devices to the storage buffer unit.

9. The system according to claim 8, further comprising means for, in the form of a burst, transporting a plurality of data elements from the storage buffer unit to an output buffer in at least one of said at least two buffer devices.

* * * * *